US012560827B2

(12) United States Patent (10) Patent No.: US 12,560,827 B2
Oudenhoven et al. (45) Date of Patent: Feb. 24, 2026

(54) WEAR DETECTION

(71) Applicant: APPLE INC., Cupertino, CA (US)

(72) Inventors: Michael J. Oudenhoven, San Francisco, CA (US); Brian S. Lau, Sacramento, CA (US); Jonathan M. Anderson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 202 days.

(21) Appl. No.: 18/219,230

(22) Filed: Jul. 7, 2023

(65) Prior Publication Data

US 2024/0036360 A1 Feb. 1, 2024

Related U.S. Application Data

(60) Provisional application No. 63/392,296, filed on Jul. 26, 2022.

(51) Int. Cl.
*G02C 11/00* (2006.01)
*G01D 5/24* (2006.01)
*G02B 27/01* (2006.01)

(52) U.S. Cl.
CPC .............. *G02C 11/10* (2013.01); *G01D 5/24* (2013.01); *G02B 27/017* (2013.01); *G02B 2027/0178* (2013.01)

(58) Field of Classification Search
CPC ........ G02C 11/10; G01D 5/24; G02B 27/017; G02B 2027/0178; G06F 1/3231; G06F 1/3265; G06F 1/163; G06F 3/011
See application file for complete search history.

(56) References Cited

U.S. PATENT DOCUMENTS

| | | | | |
|---|---|---|---|---|
| 8,184,067 | B1 * | 5/2012 | Braun ..................... | G06F 3/013 |
| | | | | 351/131 |
| 8,907,867 | B2 | 12/2014 | Wong et al. | |
| 9,664,902 | B1 | 5/2017 | Raffle et al. | |
| 10,437,309 | B2 | 10/2019 | Milford | |
| 2017/0199560 | A1 * | 7/2017 | Milford ................ | G06F 1/3231 |
| 2019/0101977 | A1 | 4/2019 | Armstrong-Muntner et al. | |
| 2019/0346697 | A1 | 11/2019 | Kan et al. | |
| 2021/0137455 | A1 * | 5/2021 | Connor ................ | A61B 5/6803 |
| 2021/0405361 | A1 | 12/2021 | Castañeda et al. | |

FOREIGN PATENT DOCUMENTS

| | | |
|---|---|---|
| EP | 2908211 B1 | 11/2017 |
| GB | 2596524 A | 1/2022 |

* cited by examiner

*Primary Examiner* — Matthew A Eason
*Assistant Examiner* — Chayce R Bibbee
(74) *Attorney, Agent, or Firm* — Young Basile Hanlon & MacFarlane, P.C.

(57) ABSTRACT

A head-mounted device includes a frame and a sensor coupled to the frame. The sensor includes a first conductive plate coupled to the frame and a first contact pad coupled to the frame and electrically coupled to the first conductive plate. The first contact pad includes an electrically conductive material embedded in a non-electrically conductive material, and the first contact pad is resiliently flexible and is configured for facial engagement. The sensor is configured to generate a signal that indicates a change in a capacitance of the sensor, and a controller is configured to change a power state of the head-mounted device based on the signal.

20 Claims, 4 Drawing Sheets

CONTROLLER                                              130

| 574  MEMORY              | PROCESSOR    572 |
| 578  COMMUNICATION INTERFACE | STORAGE   576 |

580  EXTERNAL DEVICES

690

GENERATE SIGNAL INDICATING A
CHANGE IN CAPACITANCE

692

DETERMINE HEAD-MOUNTED
DEVICE IS IN WEARABLE
CONFIGURATION

694

CHANGE POWER STATE WHEN
CHANGE IN CAPACITANCE IS
GREATER THAN A THRESHOLD
VALUE

696

WEAR DETECTION

CROSS-REFERENCE TO RELATED APPLICATIONS

This application claims the benefit of U.S. Provisional Application No. 63/392,296, filed on Jul. 26, 2022, the contents of which are hereby incorporated by reference in its entirety for all purposes.

FIELD

The present disclosure relates generally to the field of head-mounted devices.

BACKGROUND

A head-mounted device may have different operative states that consume power at different rates. The head-mounted device may include components to detect the operative state and supply power accordingly.

SUMMARY

One aspect of the disclosure is a head-mounted device including a frame and a sensor coupled to the frame. The sensor includes a first conductive plate coupled to the frame and a first contact pad coupled to the frame and electrically coupled to the first conductive plate. The first contact pad includes an electrically conductive material embedded in a non-electrically conductive material, and the first contact pad is resiliently flexible and is configured for facial engagement. The sensor is configured to generate a signal that indicates a change in a capacitance of the sensor, and a controller is configured to change a power state of the head-mounted device based on the signal.

Another aspect of the disclosure is a head-mounted device including a frame and a lens coupled to the frame and configured to display content. A sensor is coupled to the frame and is configured to generate a signal that indicates a change in capacitance of the sensor. The sensor includes a first contact pad coupled to a first conductive plate and includes an electrically conductive material and a non-electrically conductive material. A second contact pad is coupled to a second conductive plate, and the second conductive plate is electrically coupled to an electrical ground.

Yet another aspect of the disclosure is a head-mounted device including a frame and a sensor coupled to the frame. The sensor is configured to generate a signal that indicates a change in capacitance of the sensor and includes a first contact pad positioned opposite a second contact pad. The first contact pad includes an electrically conductive material embedded in a non-electrically conductive material, and the first contact pad and the second contact pad are configured to conform to a facial feature. A controller is configured to change a power state of the head-mounted device between a low-power state and a high-power state based on the signal, and the high-power state consumes more power than the low-power state to provide content.

DETAILED DESCRIPTION

The disclosure herein relates to head-mounted devices that detect the operative state of the head mounted devices and supply power according to the operative state. In some embodiments, the head-mounted device may include portions that contact a user when the head-mounted device is being worn by the user. The portions may include one or more sensors configured to generate a signal that indicates the head-mounted device is being worn, and a controller in communication with the sensors may change the power state of the head-mounted device based on the signal.

In some implementations, the sensor is coupled to a frame of the head-mounted device and includes a contact pad with both electrically conductive and electrically non-conductive materials. The electrically conductive material may be embedded in the electrically non-conductive material, in some embodiments.

Figure 1:
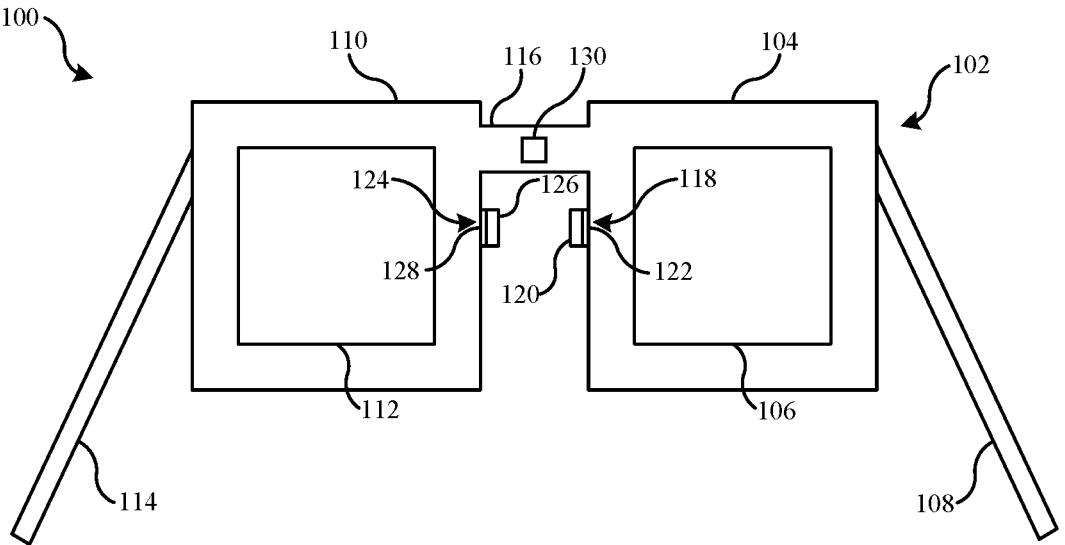
FIG. 1 is an illustration of a head-mounted device.

FIG. 1 is an illustration of a head-mounted device 100. As used herein, the term "head-mounted device" refers to a device or system configured to be removably coupled with a head of a user to provide visual content to the user. In some instances, the head-mounted device 100 may include a virtual reality device in which the head-mounted device blocks images from the environment from reaching the user and instead presents the user with virtual images presented on a display near the eyes of the user. The head-mounted device 100 may also include an augmented reality device in which the head-mounted device 100 permits images from the environment to reach the user and superimposes virtual images on top of the images from the environment via one or more displays (e.g., lenses) through which the user views the environment.

The head-mounted device 100 is shown to include a frame 102. The frame 102 includes a first frame portion 104 and a second frame portion 110 that are coupled by a bridge portion 116. The bridge portion 116 separates the first frame portion 104 and the second frame portion 110 to provide a space to receive a facial feature of the user. In some implementations, the facial feature is a nose of the user. The first frame portion 104 is configured to secure a first lens 106 and the second frame portion 110 is configured to secure a second lens 112. A first arm 108 is coupled to and extends from the first frame portion 104 and a second arm 114 is coupled to and extends from the second frame portion 110. As described, the head-mounted device 100 is in the form of glasses. However, the head-mounted device 100 may include additional forms (e.g., a virtual reality headset, etc.) in other embodiments.

The first lens 106 and the second lens 112 are coupled to the frame 102 (e.g., via the first frame portion 104 and the second frame portion 110, respectively), and are configured to display content to a user wearing the head-mounted device 100. In some implementations, the first lens 106 and the second lens 112 may include a layered structure with outer layers constructed from transparent material (e.g., glass, plastic, etc.) and configured to direct light to the eyes of the user. A waveguide may be positioned between the layers and may be configured to display content to the user.

In some implementations, the waveguide may be separated from the outer layers such that the outer layers do not contact the waveguide.

A first sensor 118 is coupled to the first frame portion 104 of the frame 102 and a second sensor 124 is coupled to the second frame portion 110 of the frame 102. The first sensor 118 and the second sensor 124 are configured to generate a signal that indicates a change in a power state of the head-mounted device 100 is required. The head-mounted device 100 may operate in various power states. For example, the power state may include a high-power state (e.g., an awake mode) where content is provided to the user, and a low-power state (e.g., a sleep mode) where no content is provided to the user, where the high power state consumes more power than the low-power state to provide content to the user. In some embodiments, the head-mounted device 100 enters the low-power state automatically. For example, the head-mounted device 100 may enter the low-power state after a period of non-use of the head-mounted device 100 (e.g., ten minutes, twenty minutes, etc.). The head-mounted device 100 may also enter the low power state based on a position of the head-mounted device 100 relative to the user. For example, the head-mounted device 100 may enter the low-power state when the head-mounted device 100 is far from the user (e.g., not being worn by the user). In some implementations, the head-mounted device 100 may enter the high-power state automatically. For example, the head-mounted device 100 may enter the high-power state at a particular time or times. The head-mounted device 100 may also enter the high-power state based on a position of the head-mounted device 100 relative to the user. For example, the head-mounted device 100 may enter the high-power state when the head-mounted device 100 is being worn by the user.

As described, the low-power state is a state in which the head-mounted device 100 does not display content to the user. In some implementations, at least some power is supplied to the head-mounted device 100 in the low-power state by a power supply such that at least the first sensor 118 and the second sensor 124 are operable to generate a signal for the controller 130. The high-power state is the state in which content of various types is displayed to the user via the first lens 106 and the second lens 112. For example, the head-mounted device 100 may show the user information related to what the user is viewing in the environment (e.g., information related to a nearby restaurant, a movie theater, a sports venue, etc.). In some embodiments, the head-mounted device 100 may provide the user with content unrelated to the environment. For example, the head-mounted device 100 may play a movie or television show that is stored in a memory of the head-mounted device 100. The head-mounted device 100 may also play content that is streamed from the Internet. In some implementations, the head-mounted device 100 may provide audio content (e.g., a radio station, a playlist saved in memory, streaming audio from a streaming service, etc.) without video content.

The first sensor 118 and the second sensor 124 may include various sensors that can generate a signal to indicate a change in a power state of the head-mounted device 100 is required. For example, the first sensor 118 and the second sensor 124 may include an infrared sensor and/or an ultrasonic sensor configured to generate a signal when the first sensor 118 and/or the second sensor 124 is near the face of the user (e.g., to indicate that the user is wearing the head-mounted device 100). The first sensor 118 and the second sensor 124 may include an electrically resistive sensor configured to generate a signal when the first sensor 118 and/or the second sensor 124 are in contact with a face of the user. For example, displacement of a resistive sensor caused by contact between the resistive sensor and the face of the user may cause a change in resistance of the sensor, indicating that the user is wearing the head-mounted device 100. Additionally, the first sensor 118 and the second sensor 124 may include a capacitive sensor that is configured to generate a signal that indicates a change in capacitance of the first sensor 118 and/or the second sensor 124, where the change in capacitance indicates whether the head-mounted device 100 is in contact with the face of the user.

In embodiments where the first sensor 118 and the second sensor 124 include a capacitive sensor, the first sensor 118 includes a first conductive plate 122 that is coupled to the first frame portion 104 of the frame 102, and the second sensor 124 includes a second conductive plate 128 that is coupled to the second frame portion 110 of the frame 102. The first conductive plate 122 and the second conductive plate 128 may include any type of electrically conductive material. For example, the first conductive plate 122 and the second conductive plate 128 may include a plate formed of copper, aluminum, silver, brass, or any other type of electrically conductive material. In some implementations, the second conductive plate 128 may be electrically coupled to an electrical ground that is electrically coupled with the second sensor 124 and is part of a sensor circuit 466 (shown in FIG. 4). The first conductive plate 122 and the second conductive plate 128 may also be formed in any geometric configuration suitable for the application. For example, the first conductive plate 122 and the second conductive plate 128 may be in the form of a rectangle, a square, a circle, an oval, or an irregular geometric shape.

The first sensor 118 also includes a first contact pad 120 and the second sensor 124 also includes a second contact pad 126. The first contact pad 120 is coupled to the first frame portion 104 of the frame 102 and the second contact pad 126 is coupled to the second frame portion 110 of the frame 102. In some embodiments, the first contact pad 120 is electrically coupled to the first conductive plate 122 and the second contact pad 126 is in contact with (e.g., coupled to) the second conductive plate 128. In some embodiments, the first contact pad 120 includes an electrically conductive material embedded in a non-electrically conductive material. This embodiment is further described with reference to FIG. 4. In some implementations, the second contact pad 126 also includes an electrically conductive material embedded in a non-electrically conductive material. In implementations where the second conductive plate 128 is electrically coupled to an electrical ground, the second contact pad 126 may be free of electrically conductive materials.

The first contact pad 120 and the second contact pad 126 may be resiliently flexible and configured for facial engagement such that the first contact pad 120 and the second contact pad 126 are configured to conform to a facial feature. For example, the first contact pad 120 and the second contact pad 126 may include materials such as silicone and/or rubber that are configured to deform when in contact with a facial portion of the user and to return to their original configurations when not in contact with the facial portion of the user. As shown in FIG. 1, the first contact pad 120 and the second contact pad 126 are configured to contact a nose of the user (e.g., the first contact pad 120 is configured to contact a first side of a nose of the user and the second contact pad 126 is configured to contact a second side of the nose of the user) when the head-mounted device 100 is being worn by the user (e.g., the first contact pad 120 is positioned opposite the second contact pad 126). In some implementations, the first contact pad 120 and the second contact pad 126 are configured to be removed from the frame 102 and are interchangeable with additional contact pads configured to be coupled to the frame 102. For example, the first contact pad 120 and/or the second contact pad 126 may be removed from the frame 102 to perform maintenance (e.g., cleaning the first conductive plate 122 and/or the second conductive plate 128) and the first contact pad 120 and/or the second contact pad 126 may then be reassembled to the frame 102. In some implementations, the first contact pad 120 and/or the second contact pad 126 may be replaced by additional contact pads after being removed. In some embodiments, the additional contact pads may include different sizes (e.g., thickness, length, etc.) to conform to different sizes of facial features of the user.

The head-mounted device 100 is also shown to include a controller 130. The controller 130 is configured to receive a signal from the first sensor 118 and/or the second sensor 124 and is configured to change the power state of the head-mounted device 100 between the low-power state and the high-power state based on the signal, where the high-power state consumes more power than the low-power state to provide content to the user. For example, if the head-mounted device 100 is in a low-power state and the controller 130 receives a signal from the first sensor 118 and/or the second sensor 124 that indicates a change in capacitance (e.g., an increase in capacitance), the controller 130 may direct the head-mounted device 100 to enter the high-power state to allow the head-mounted device 100 to display content to the user. If the head-mounted device 100 is in the high-power state and the controller 130 receives a signal that indicates a change in capacitance (e.g., a decrease in capacitance), the controller 130 may direct the head-mounted device 100 to enter the low-power state to conserve power. In some implementations, the controller 130 may wait for a threshold period before directing the head-mounted device 100 to enter the low-power state to avoid instances where the user temporarily removes the head-mounted device 100 (e.g., to clean the first lens 106 and/or the second lens 112, to rub the eyes of the user, to rest the eyes of the user for a brief period, etc.) and then resumes wearing the head-mounted device 100. In some embodiments, the threshold period may be initially set at a specific value (e.g., one minute) but the user may change the threshold period to a desirable value (e.g., thirty seconds, two minutes, etc.), if needed. In some implementations, the controller 130 is configured to change the power state between the low-power state and the high-power state when the change in capacitance is greater than a threshold value. For example, the capacitance of the first sensor 118 and/or the second sensor 124 may decrease if the user pushes the head-mounted device 100 up higher on the nose of the user or slides the head-mounted device 100 further down the nose of the user, but the decrease in capacitance may remain below the threshold value such that the controller 130 does not direct the head-mounted device 100 to enter the low-power state. If the user removes the head-mounted device 100 from the face of the user, the change in capacitance is greater than the threshold value, and the controller 130 may direct the head-mounted device 100 to enter the low-power state (after any applicable threshold period).

In another embodiment, the first arm 108 and the second arm 114 include a folded position and an unfolded position, and the controller 130 is configured to maintain the head-mounted device 100 in a low-power state when the first arm 108 and/or the second arm 114 is in the folded position. For example, the first arm 108 and/or the second arm 114 may include one or more sensors that are configured to generate a signal that indicates whether the first arm 108 and/or the second arm 114 are in the folded or unfolded position. The controller 130 is configured to receive the signal and determine whether to maintain the head-mounted device 100 in the low-power state or to direct the head-mounted device 100 to enter the high-power state. As an operative example, the head-mounted device 100 may be stored by the user in the folded position, and the user may grasp the head-mounted device 100 (e.g., to move the head-mounted device 100) and contact the first sensor 118 and/or the second sensor 124 such that the change in capacitance is higher than the threshold value. However, because the controller 130 determines that the head-mounted device 100 is in the folded position (e.g., not configured to be worn by the user), the controller 130 maintains the head-mounted device 100 in the low-power state until the head-mounted device 100 is configured to be worn by the user.

Figure 2:
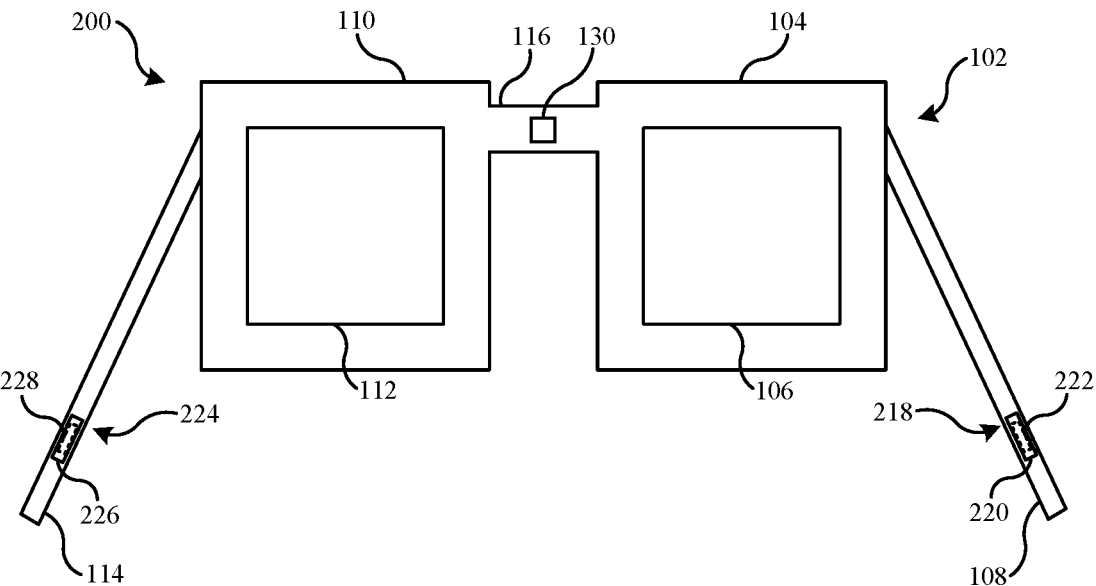
FIG. 2 is an illustration of another head-mounted device.

FIG. 2 is an illustration of another head-mounted device 200. The head-mounted device 200 includes the frame 102 as previously described. The difference between the head-mounted device 100 and the head-mounted device 200 is the location of the sensors. As shown in FIG. 2, the head-mounted device 200 includes a first sensor 218 coupled to the first arm 108 and configured to contact a head of the user, and a second sensor 224 coupled to the second arm 114 and configured to contact the head of the user. The first sensor 218 includes a first conductive plate 222 and a first contact pad 220, and the second sensor 224 includes a second conductive plate 228 and a second contact pad 226. Operation of the first sensor 218 and the second sensor 224 is similar to that of the first sensor 118 and the second sensor 224 as previously described, where contact between the first contact pad 220, the second contact pad 226, and the head of the user occurs near the ears of the user. For example, the first contact pad 220 is configured to contact a portion of the head of the user near a first ear of the user and the second contact pad 226 is configured to contact a portion of the head of the user near a second ear of the user.

Figure 3:
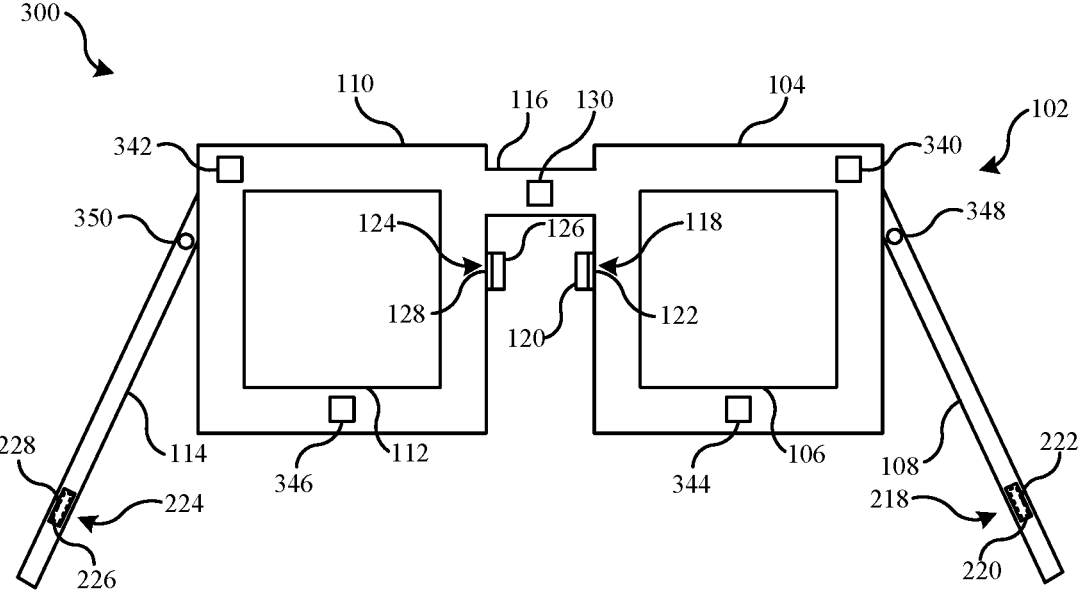
FIG. 3 is an illustration of yet another head-mounted device.

FIG. 3 is an illustration of another head-mounted device 300. The head-mounted device 300 includes the frame 102 as previously described. The difference between the head-mounted device 300, the head-mounted device 200, and the head-mounted device 100 is the types of sensors and locations of sensors. For example, the head-mounted device 300 may include the first sensor 118, the second sensor 124, the first sensor 218, and the second sensor 224 as previously described. The head-mounted device 300 may also include, for example a first infrared sensor 340, a second infrared sensor 342, a first ultrasonic sensor 344, a second ultrasonic sensor 346, a first visible light camera 348, and a second visible light camera 350 (referred to herein as "sensors 340-350"). Each of the sensors 340-350 of the head-mounted device 300 may be configured to generate a signal that indicates whether the head-mounted device 300 is being worn by the user, and the controller 130 may direct the head-mounted device 300 to enter a power state based on the signals received from the sensors 340-350.

For example, the first infrared sensor 340 and the second infrared sensor 342 may be configured to generate a signal that indicates when the face of the user is near the frame 102 (e.g., to indicate that the user is wearing the head-mounted device 300). Similarly, the first ultrasonic sensor 344 and the second ultrasonic sensor 346 may be configured to generate a signal that indicates when the face of the user is near the frame 102. The first visible light camera 348 and the second visible light camera 350 may be configured to generate a signal that indicates when the face of the user is near the first arm 108 and the second arm 114, respectively (e.g., to indicate that the user is wearing the head-mounted device 300). Though the sensors of the head-mounted device 300 are shown in specific locations, any of the sensors described above may be included in different locations on the head-mounted device 300.

The controller 130 is configured to receive the signals generated by the sensors of the head-mounted device 300, determine a power state based on the signals, and direct the head-mounted device 300 to enter the determined power state. For example, the first sensor 118, the second sensor 124, the first sensor 218, the second sensor 224, and the sensors 340-350 may generate signals that indicate the head-mounted device 300 is being worn by the user, so the controller 130 may direct the head-mounted device 300 to enter the high-power state in response to the signals. In some implementations, the controller 130 is configured to determine the power state based on a portion of the signals received. For example, if one or more of the sensors coupled to the head-mounted device 300 malfunctions, the controller 130 may determine the power state based on the signals received from the operable sensors.

Figures 4, 5:
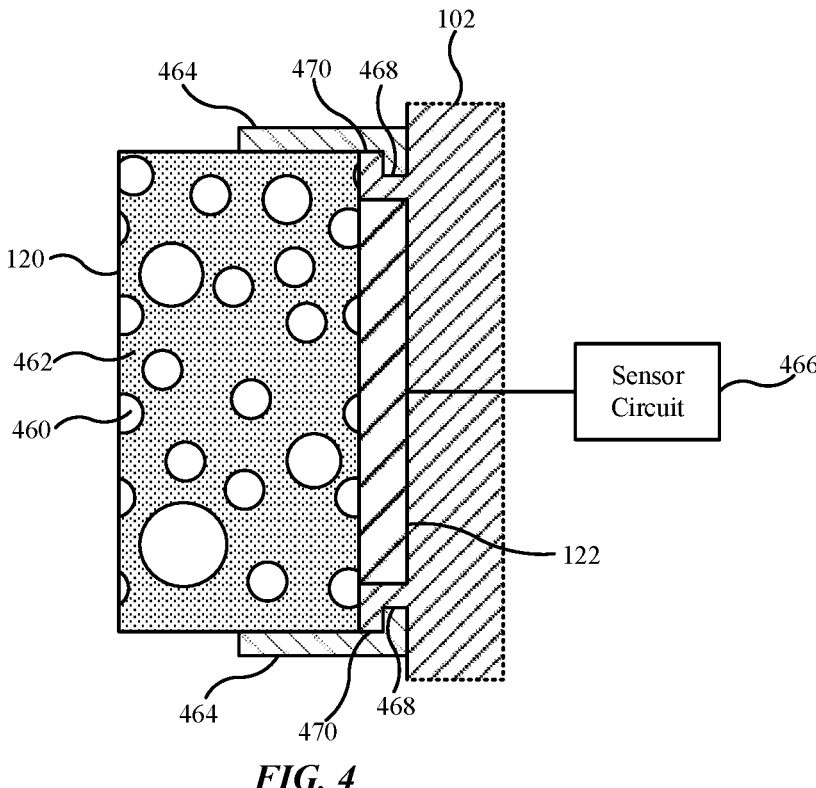
FIG. 4 is an illustration of a cross-section of a contact pad of the head-mounted devices of FIGS. 1-3.
FIG. 5 is a schematic representation of a controller of the head-mounted devices of FIGS. 1-3.

FIG. 4 is an illustration of a cross-section of the first contact pad 120 of the head-mounted devices 100, 200, 300, of FIGS. 1-3. As shown, the first contact pad 120 is coupled to the frame 102 by a coupler 464. In some implementations, the coupler 464 is fixed to the first contact pad 120 and is configured to interface with the frame 102 to connect the first contact pad 120 to the frame 102. For example, the coupler 464 may include a first geometric feature 468 (e.g., a protrusion, a lip, a ridge, a tab, etc.) and the frame 102 may include a second geometric feature 470 (e.g., a recess, a slot, a groove, etc.) that corresponds to the first geometric feature 468 and is configured to receive the first geometric feature 468. The first contact pad 120 can be removed or released from the frame 102 by disengaging the first geometric feature 468 from the second geometric feature 470.

The first contact pad 120 is shown to include an electrically conductive material 460 and a non-electrically conductive material 462. In some implementations, the electrically conductive material 460 is embedded in the non-electrically conductive material 462. The electrically conductive material 460 may include electrically conductive particles that are suspended within the non-electrically conductive material 462. In some implementations, the particles are a uniform size. The particles may also be different sizes. The particles may be a uniform shape (e.g., spherical, cylindrical, etc.), but may also include different shapes. The electrically conductive material 460 may include materials such as copper, aluminum, silver, brass, or any other type of electrically conductive material. The non-electrically conductive material 462 may include a resilient material such as silicone and/or rubber that is configured to conform to a facial feature of the user.

The first conductive plate 122 is coupled with, and is part of, the sensor circuit 466. The sensor circuit 466 may also include the first contact pad 120, the second conductive plate 128, and a power source. In some implementations, the sensor circuit 466 also includes the second contact pad 126.

FIG. 5 is a schematic representation of the controller 130 of the head-mounted devices 100, 200, 300, of FIGS. 1-3. The controller 130 may be used to implement the systems and methods disclosed herein. For example, the controller 130 may receive data from any of the sensors disclosed herein (e.g., the first sensor 118, the second sensor 124, the first sensor 218, the second sensor 224, and the sensors

340-350) and control a power state of the head-mounted devices 100, 200, 300 in response. In an example hardware configuration, the controller 130 generally includes a processor 572, a memory 574, a storage 576, and a communication interface 578. The processor 572 may be any suitable processor, such as a central processing unit, for executing computer instructions and performing operations described thereby. The memory 574 may be a volatile memory, such as random-access memory (RAM). The storage 576 may be a non-volatile storage device, such as a hard disk drive (HDD) or a solid-state drive (SSD). The storage 576 may form a computer readable medium that stores instructions (e.g., code) executed by the processor 572 for operating and/or communicating with external devices 580, for example, in the manners described above and below. The communication interface 578 is in communication with, for example, the external devices 580, for sending to and receiving from various signals (e.g., control signals and/or notifications). The external devices 580 may include, for example, systems or devices through which the controller 130 may provide content to the user. For example, the external devices 580 may include a mobile device (e.g., a mobile phone, tablet computer, laptop computer, etc.) associated with user, where the mobile device includes content that can be provided to the user via the head-mounted devices 100, 200, 300. The controller 130 may include an Internet and/or Bluetooth connection to facilitate communication between the controller 130 and the external devices 580.

Figure 6:
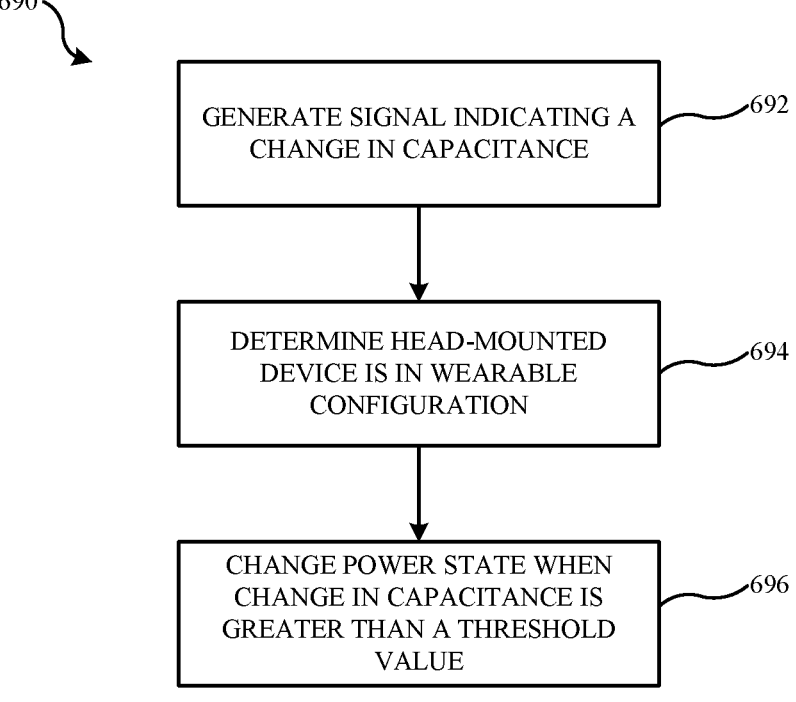
FIG. 6 is a flow chart of a method of altering a power state of the head-mounted devices of FIGS. 1-3.

FIG. 6 is a flow chart of a method 690 of altering a power state of the head-mounted devices 100, 200, 300 of FIGS. 1-3. In some embodiments, the method 690 can be implemented by the controller 130. At operation 692, a signal is generated that indicates a change in capacitance. For example, the head-mounted device 100 may be placed on the head of the user, and the first contact pad 120 may contact a first side of a nose of the user, and the second contact pad 126 may contact a second side of the nose of the user. Contact between the first contact pad 120 and the nose of the user causes the conductive material 460 to contact skin of the user and define an electrical connection between the first conductive plate 122 and the skin, which causes a change in capacitance (e.g., the capacitance measured through the body of the user). The sensor circuit 466 generates a signal that indicates the change in capacitance, and the signal is provided to the controller 130.

At operation 694, a determination is made regarding whether the head-mounted device 100, 200, 300 is in a wearable configuration. As used herein, the term "wearable configuration" refers to a configuration of the head-mounted device 100, 200, 300 in which a user can wear the head-mounted device 100, 200, 300. For example, when one or more of the first arm 108 and the second arm 114 are folded, the head-mounted device 100, 200, 300 is not in a wearable configuration (e.g., the head-mounted device 100, 200, 300 is in the folded or partially-folded position). When both of the first arm 108 and the second arm 114 are in the unfolded position, the head-mounted device 100, 200, 300 is in a wearable configuration. In some implementations, the controller 130 is configured to receive a signal from one or more sensors (e.g., any of the sensors described herein) that indicates the position of the first arm 108 and the second arm 114.

At operation 696, a power state of the head-mounted device 100, 200, 300 is changed when the change in capacitance is greater than a threshold value. For example, the controller 130 compares the change in capacitance indicated by the signal received in operation 692 to a threshold value. If the change in capacitance indicated by the signal is less than the threshold value, the power state of the head-mounted device 100, 200, 300 is not changed. If the change in capacitance indicated by the signal received in operation 692 is greater than or equal to the threshold value, the power state of the head-mounted device 100, 200, 300 is changed. For example, the power state of the head-mounted device 100, 200, 300 may change from a sleep mode (e.g., where no content is displayed to the user) to an awake mode. In the awake mode, various content may be displayed to the user. For example, content related to the environment may be displayed to the user (e.g., virtual content may be superimposed on real images viewed by the user through the first lens 106 and the second lens 112). As another example, streaming content may be displayed to the user (e.g., videos, shows, movies, etc., that are not related to the environment may be displayed to the user).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use during operation of the head-mounted devices 100, 200, 300. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores user-preference related information that allows a user to adjust operation of the head-mounted device 100, 200, 300 according to the user preferences. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile for adjusting when to transition from a sleep mode to an awake mode, and vice versa, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identi-fiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user-preference information may be determined each time the head-mounted devices 100, 200, 300 are used, such as by entering user-preference information in real time, and without subsequently storing the information or asso-ciating with the particular user.

What is claimed is:

1. A head-mounted device, comprising:
a frame;
a sensor coupled to the frame, the sensor including:
   a first conductive plate coupled to the frame;
   a first contact pad electrically coupled to the first conductive plate, wherein the first contact pad includes an electrically conductive material embed-ded in a non-electrically conductive material, and the first contact pad is resiliently flexible and is config-ured to contact a facial feature;
   a second conductive plate coupled to the frame and electrically coupled to an electrical ground;
   a second contact pad that includes the non-electrically conductive material and is free of the electrically conductive material; and
   a coupler configured to removably couple the first contact pad to the frame,
wherein the sensor is configured to generate a signal that indicates a capacitance of the first conductive plate, and
wherein the capacitance of the first conductive plate is configured to change based on the first contact pad contacting the facial feature; and
a controller configured to change a power state of the head-mounted device based on the signal.

2. The head-mounted device of claim 1, wherein the first contact pad is configured to contact a first side of a nose.

3. The head-mounted device of claim 2, wherein the second contact pad is configured to contact a second side of the nose.

4. The head-mounted device of claim 1, wherein the frame includes an arm, and the sensor is coupled to the arm and is configured to contact a head of a user.

5. The head-mounted device of claim 1, wherein the power state includes a high-power state and a low-power state, and the high-power state consumes more power than the low-power state to provide content to a user.

6. The head-mounted device of claim 1, wherein the first contact pad is configured to be removed from the frame and is interchangeable with an additional contact pad configured to be coupled to the frame.

7. The head-mounted device of claim 1, wherein the coupler is fixed to the first contact pad and is configured to interface with the frame to removably couple the first contact pad to the frame.

8. The head-mounted device of claim 1, wherein the controller is configured to change the power state of the head-mounted device to a high-power state when the signal indicates an increase in capacitance greater than a threshold value and the controller is configured to change the power state of the head-mounted device to a low-power state when the signal indicates a decrease in capacitance greater than a threshold value.

9. A head-mounted device, comprising:
a frame;
a lens coupled to the frame and configured to display content; and
a sensor coupled to the frame that is configured to generate a signal that indicates a change in capacitance of the sensor, the sensor comprising:
   a first contact pad coupled to a first conductive plate and including an electrically conductive material and a non-electrically conductive material, wherein the first contact pad is configured to contact a first side of a facial feature; and
   a second contact pad coupled to a second conductive plate, wherein the second contact pad includes the non-electrically conductive material and is free of the electrically conductive material, the second con-tact pad is configured to contact a second side of the facial feature, and the second conductive plate is electrically coupled to an electrical ground.

10. The head-mounted device of claim 9, wherein the first contact pad is positioned opposite the second contact pad, the first side of the facial feature is a first side of a nose, the second side of the facial feature is a second side of the nose, and the first contact pad and the second contact pad are configured to contact the first side of the nose and the second side of the nose, respectively.

11. The head-mounted device of claim 9, further com-prising a controller configured to change a power state of the head-mounted device between a low-power state and a high-power state based on the signal.

12. The head-mounted device of claim 9, wherein the electrically conductive material includes electrically con-ductive particles, and the electrically conductive particles are suspended within the non-electrically conductive mate-rial.

13. The head-mounted device of claim 12, wherein the non-electrically conductive material includes silicone or rubber.

14. The head-mounted device of claim 9, wherein the first contact pad and the second contact pad are configured to be removed from the frame.

15. The head-mounted device of claim 9, further com-prising an arm portion coupled to the frame and including a folded position and an unfolded position, wherein a control-ler is configured to maintain the head-mounted device in a low-power state when the arm portion is in the folded position.

16. A head-mounted device, comprising:
a frame;
a sensor coupled to the frame and configured to generate a signal that indicates a change in capacitance of the sensor, the sensor including a first contact pad posi-tioned opposite a second contact pad, wherein:
   the first contact pad includes an electrically conductive material embedded in a non-electrically conductive material,
   the first contact pad is in contact with a first conductive plate,
   the second contact pad is in contact with a second conductive plate, the second contact pad includes the non-electrically conductive material and is free of the electrically conductive material, the second conductive plate is electrically coupled to an electrical ground, and the first contact pad and the second contact pad are configured to conform to a facial feature; and a controller configured to change a power state of the head-mounted device between a low-power state and a high-power state based on the signal, wherein the high-power state consumes more power than the low-power state to provide content.

17. The head-mounted device of claim 16, wherein the controller is configured to change the power state between the low-power state and the high-power state when the change in capacitance is greater than a threshold value.

18. The head-mounted device of claim 16, further comprising an arm portion coupled to the frame and including a folded position and an unfolded position, wherein the controller maintains the head-mounted device in the low-power state when the arm portion is in the folded position.

19. The head-mounted device of claim 16, wherein the first contact pad is configured to be removed from the frame.

20. The head-mounted device of claim 16, wherein the first contact pad and the second contact pad are configured to contact a nose.

\* \* \* \* \*